Figure 18:
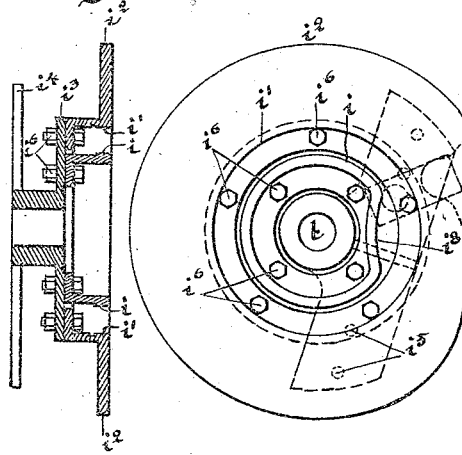

(No Model.) 5 Sheets—Sheet 1.
C. B. KENDALL.
CAN HEADING MACHINE.
No. 450,624. Patented Apr. 21, 1891.
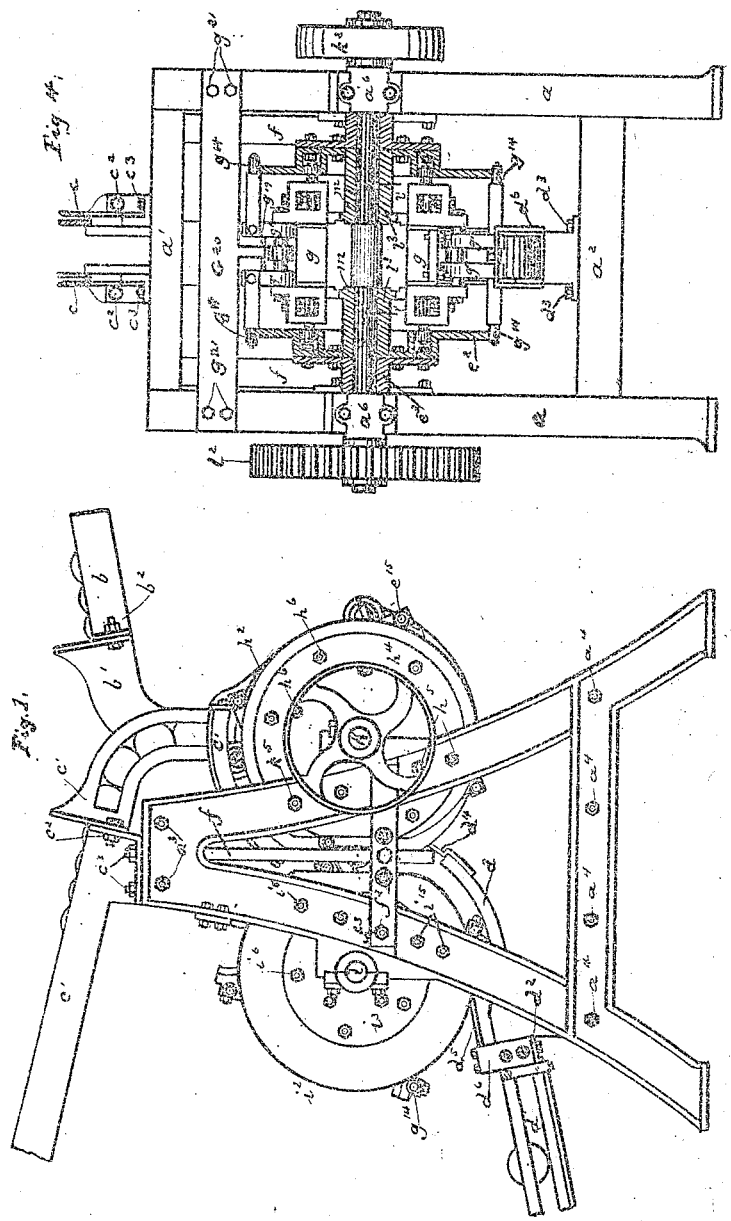
WITNESSES
INVENTOR
Charles B. Kendall
BY
ATTORNEY (No Model.)
C. B. KENDALL.
CAN HEADING MACHINE.
No. 450,624. Patented Apr. 21, 1891.
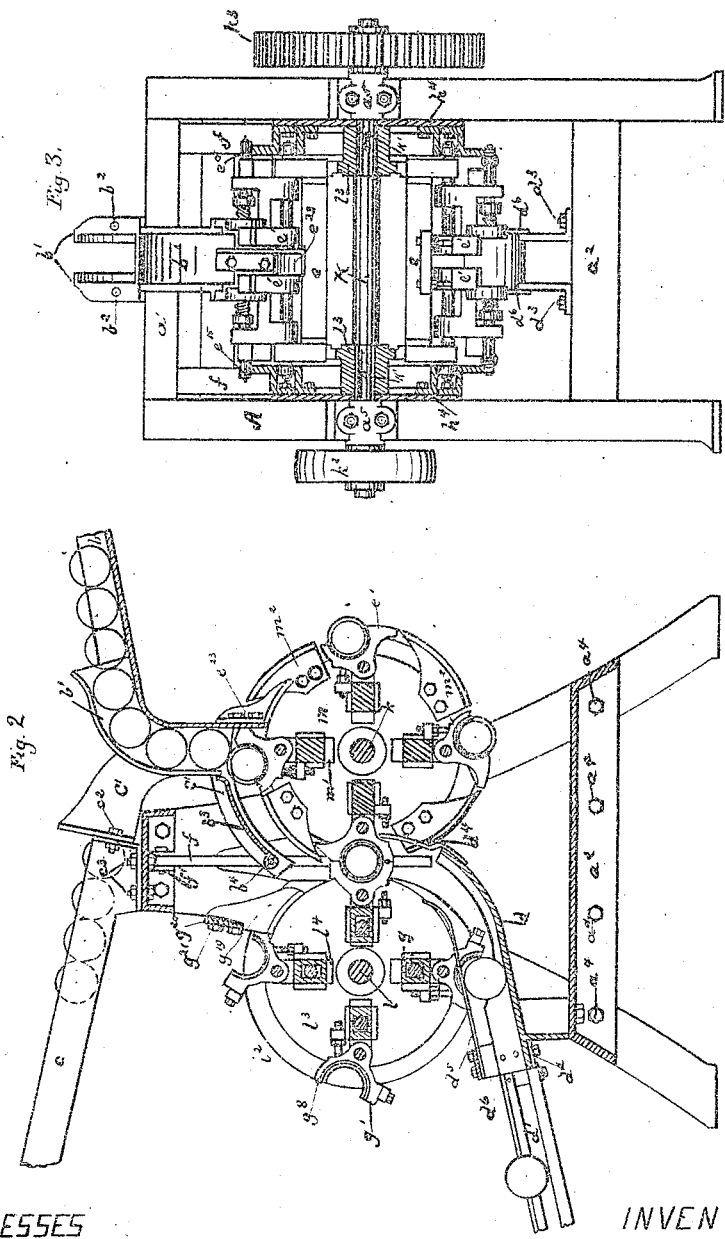

(No Model.)  5 Sheets—Sheet 3.
C. B. KENDALL.
CAN HEADING MACHINE.
No. 450,624. Patented Apr. 21, 1891.
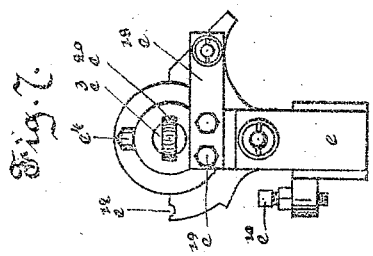
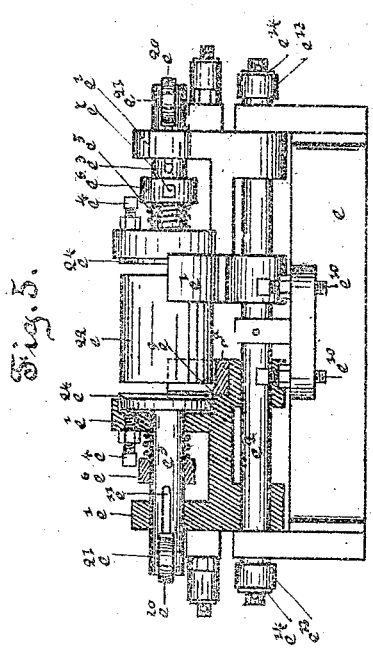
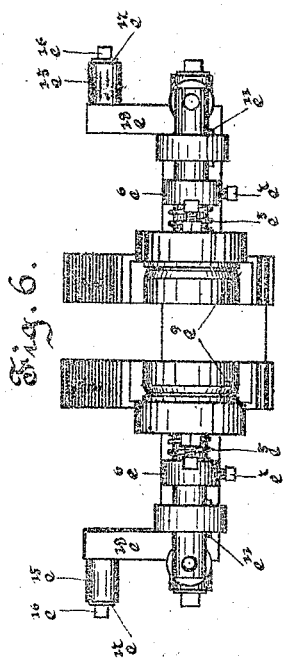
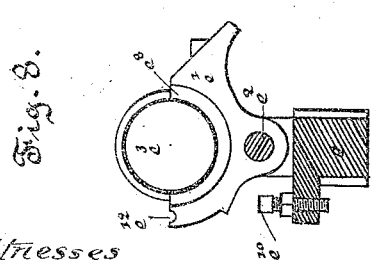
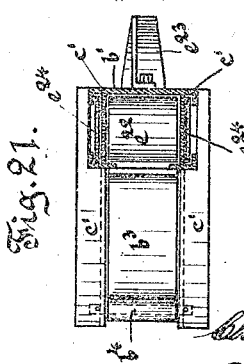
Witnesses
Inventor.

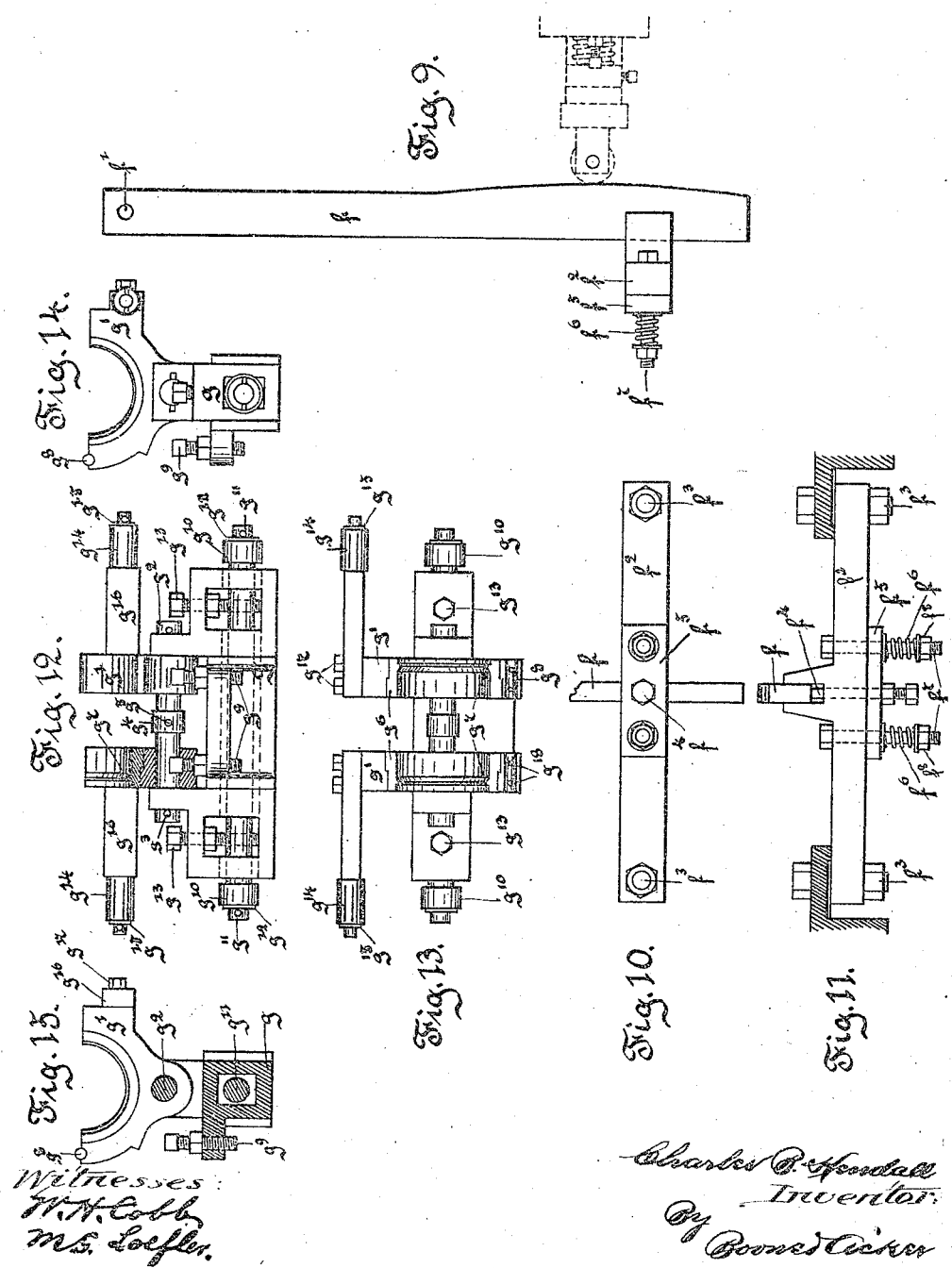

(No Model.) 5 Sheets—Sheet 5.

C. B. KENDALL.
CAN HEADING MACHINE.

No. 450,624. Patented Apr. 21, 1891.

UNITED STATES PATENT OFFICE.

CHARLES B. KENDALL, OF NEWTON, MASSACHUSETTS.

CAN-HEADING MACHINE.

SPECIFICATION forming part of Letters Patent No. 450,624, dated April 21, 1891.

Application filed September 20, 1890. Serial No. 365,692. (No model.)

*To all whom it may concern:*

Be it known that I, CHARLES B. KENDALL, a citizen of the United States, residing at Newton, in the county of Middlesex and State of Massachusetts, have invented certain new and useful Improvements in Can-Heading Machines; and I do hereby declare the following to be a full, clear, and exact description of said invention, such as will enable others skilled in the art to which it most nearly appertains to make, use, and practice the same.

My invention has relation to that class of machinery known as "can-heading machines," which consists in the arrangements of parts and details of construction, as will be hereinafter more fully set forth in the drawings, described, and pointed out in the specification.

The main feature of my invention consists in providing rotating disks traveling in opposite directions, which carry a series of half-circular sockets, (preferably termed in contradistinction "header" and "retaining jaws,") which during the course of rotation receive the heads and can-bodies, head the latter, and discharge the completed can during the rotation of said disks whether reciprocating or continuous.

My invention further consists in providing seats upon which the ends of the can-bodies may rest while moving into position for being headed, lips on the inside diameter of the header, and retaining-jaws of a smaller diameter than the inside diameter of the can-heads for the purpose of reducing the diameter of the can-body while the heads are being placed thereon, thereby preventing possibility of collision between the edges of the can-body and flanges of the can-heads, and, lastly, in providing spring-actuated cams for simultaneously and automatically forcing the heads upon the can-body, and adapted to allow for variable lengths of can-bodies.

For a more comprehensive understanding of my invention reference must be had to the accompanying drawings, wherein similar letters of reference are used to denote corresponding parts throughout the entire specification and several views.

Figure 16:
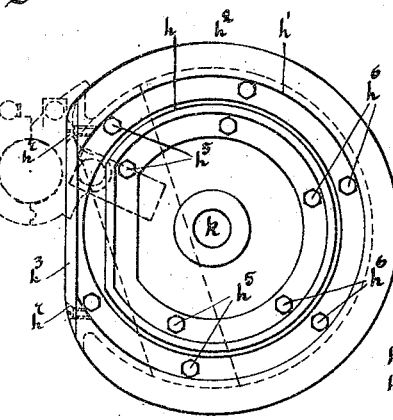
Figure 17:
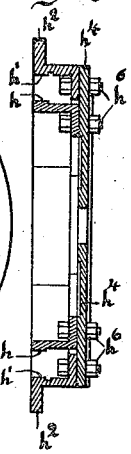
Figure 20:
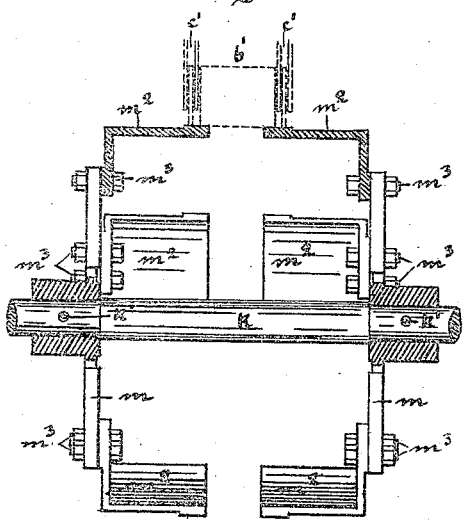
Figure 19:
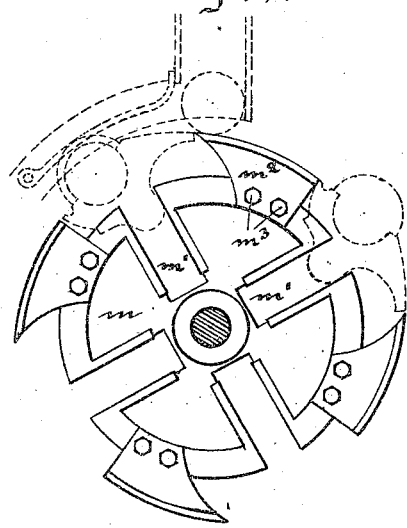

Figure 1 is a view in side elevation of the entire machine; Fig. 2, a longitudinal sectional view thereof; Fig. 3, an end view showing can-body feed-chute, heading-jaws, disks, and tracks in cross-section; Fig. 4, a similar view showing opposite end of machine; Fig. 5, a side view and longitudinal section of truck which carries the headers; Fig. 6, a top plan of Fig. 5; Fig. 7, an end view of Fig. 5; Fig. 8, a vertical cross-sectional view of Fig. 5; Fig. 9, a side view of the vertical spring-actuated cam which is adapted to operate header-pistons for forcing the can-heads upon the can-bodies; Fig. 10, an end view of Fig. 9; Fig. 11, a top plan thereof; Fig. 12, a longitudinal sectional side view of truck carrying the retaining-jaws; Fig. 13, a top plan view of Fig. 12; Fig. 14, an end view of Fig. 12; Fig. 15, a vertical cross-section thereof; Fig. 16, a side view, showing one set of tracks within which the rollers of headers and retaining-jaws operate, showing the two in position immediately after closing; Fig. 17, a cross-sectional view showing one set of tracks, which operate the heading-jaws; Fig. 18, a similar view showing track which operates retaining-jaws. Fig. 19 is a side view of the disks which carry the trucks containing the headers and brackets for preventing the can bodies and heads from dropping out of the feed-chutes while the headers are moving into proper position to receive the can bodies and heads; Fig. 20, a cross-section of Fig. 19, and Fig. 21 a detail top plan showing more fully the swinging gate $b^5$ set forth in Fig. 2.

The letter $a$ indicates the upright standards of the frame, to which are bolted the top and bottom distance-pieces $a'$ $a^2$ by means of bolts $a^3$ $a^4$. Above the frame and leading from any suitable point I locate the can-body and head feed-chutes, preferably formed in sections $b$ $b'$ and $c$ $c'$, united by bolts $b^2$ $b^3$, and which I secure to the frame by means of bolts $c^2$. The diverging mouths $b'$ $c'$ are formed of one piece, of which the end $b'$ receives the can-bodies and $c'$ the can-heads. Located between the ends of the continuation of the can-head chute $c'$ is the swinging gate $b^5$, which is pivoted by means of bolt or pin $b^4$, and is designed for the purpose of permitting access to be had to the interior thereof when necessity may require. Below and extending from one end of the side of the frame I locate the discharge-chute $d$, consisting of the sections $d$ $d'$, which are secured to the distance-piece $a^2$ by means of bolts $d^3$. Secured to the bottom of the discharge-chute and extending upwardly between the headers $e'$ is the tongue $d^4$, which serves to force the headed cans from said headers into the discharge-chute. In order to force the headed cans from between the retaining-jaws, (similar to tongue $d^4$,) I fasten the tongue $d^5$ to the top of discharge-chute by means of strap $d^6$ or bolts.

Referring to Fig. 5, the letter $e$ represents the trucks which carry the headers $e'$, working on shaft $e^2$, and carrying the pistons $e^3$, which are adapted, through the medium of the hereinafter-described spring-actuated cams, to force the can-heads upon the can-bodies. By means of the set-screws $e^4$ I am enabled to change or adjust the position of pistons $e^3$. Springs $e^5$ rest against the headers $e'$ and impinge against collars $e^6$, which are fastened to piston $e^3$ by set-screws $e^7$, and thus serve by their resiliency to force the pistons back after the can-bodies have been headed. In order to contract the ends of the can-bodies to a diameter less than the diameter of the can-head flange so as to avoid collision during the heading thereof, I provide the rings $e^8$, which are fastened to the headers $e'$, and have their inner faces provided with lips $e^9$. By means of set-screws $e^{10}$ the position of headers $e'$ may be suitably adjusted, while by use of keys $e^{11}$, which work in keyways formed in piston $e^3$, I am enabled to provide against the turning thereof in headers $e'$. In the outer face of the edge of the headers $e'$ I form the grooves or holes $e^{12}$, which register with pin or pins $g^8$, formed in the retaining-jaws $g'$, as the can heads and bodies are being inclosed by the headers $e'$ and the closing or retaining jaws $g'$. By means of rolls $e^{13}$, which are held in place on shaft $e^2$ by washers $e^{14}$, I am enabled to bring the trucks carrying the headers $e'$ in proper position with retaining-jaws $g'$ for the heading of the bodies, inasmuch as the same travel in tracks or circular pathways $h\ h'$, fastened or bolted to stationary plates or disks $h^4$. In order to facilitate and secure a perfect registering of the headers and retaining-jaws, I further provide the rolls $e^{15}$, which are held in place upon brackets $e^{18}$ by pins $e^{16}$ and washers $e^{17}$, which brackets are secured to the headers $e'$ by bolts $e^{19}$. These rolls I revolve or rotate within and upon tracks or pathways $h\ h'\ h^2$, Fig. 16, which are attached to plate or disk $h^4$. To the outer ends of piston $e^3$ and within slots or openings formed therein are located the rolls $e^{20}$, which revolve upon pins $e^{21}$, and during rotation of disks $m$ are adapted to contact with spring-actuated cams $f$ and cause the inward or forward movement of pistons $e^3$, which movement of said pistons forces the can-heads upon the can-bodies.

In Fig. 2 I have shown the headed can in position to be discharged into chute $d'$. In Fig. 5 I have shown the can-bodies $e^{22}$ and can-heads $e^{24}$ in position within the headers and deposited from the feed-chutes $b'\ c'$. To the rear of the can-body feed-chute $b'$ is secured the cam $e^{23}$, which serves to force apart the headers $e'$, in order to receive the bodies and heads as discharged from chutes $b'\ c'$.

The trucks carrying what I term the "retaining" or "holding" jaws $g'$, which in shape correspond with headers or holding-jaws $e'$, are indicated by the letter $g$, which I provide with axles or shafts $g^2$, upon which the retaining-jaws work. Said shafts are held in position by means of pins $g^3$, and have secured centrally thereon, by means of pins $g^5$, the collars $g^4$, which are designed for the purpose of maintaining the distance between the jaws, so as to provide against the hitting thereon of cam $g^{19}$, at the same time providing against the liability of the retaining-jaws coming too close together. The retaining-jaws $g'$ are secured to rings $g^6$, which have their inner faces provided with lips $g^7$, which are adapted to contract the circle of the can-body to a smaller diameter than the inside diameter of the can-head flange, similar to the lips $e^9$, previously described. To the outer face of retaining-jaws $g'$ is secured, by means of screws $g^{18}$ or otherwise, the projecting pins $g^8$, which are adapted to register with openings $e^{12}$, formed in the header-jaws $e'$, while the bodies are being inclosed by the retaining and header jaws.

By means of the set-screws $g^9$ I am enabled to adjust the retaining-jaws to any position. Secured to shafts $g^{11}$, which pass through trucks $g$ by means of washers $g^{12}$, are rolls $g^{10}$, which run between the track or trackways $i\ i'$, secured to stationary plate or disk $i^3$, and are adapted to bring the retaining jaws or holders $g'$ into proper position with headers or holders $e'$ while the can-bodies are being headed. The shafts $g^{11}$ are adjusted within trucks $g$ by means of the adjusting-screws $g^{13}$, which adjustability allows for such adjustment of the retaining-jaws $g'$ as to allow for perfect contact being made with the headers $e'$ during the operation of inclosure of the can-bodies in a manner similar to the headers. In order to facilitate the movement of the retaining jaws or holders and registering thereof with headers, I provide the rolls $g^{14}$, which, by means of washers $g^{15}$, are held in place in brackets $g^{16}$, and by bolts $g^{17}$ are attached to retaining-jaws $g'$. Said rolls rotate or run on guide-tracks $i^2$, which are fastened to plate or disk $i^3$. In order to force and maintain the retaining-jaws $g'$ open so as to register with the header-jaws $e'$, there is provided the cam $g^{19}$, which is fastened to stand $a$ with cross-bar $g^{20}$, by means of bolts $g^{21}$. (Clearly shown in Figs. 1 and 2.)

The letter $f$ represents vertical cams, which are suspended from the stands of frame $a$ by pins $f'$. (Clearly shown in Figs. 1, 2, 3, and 4.) These cams are guided in vertical slots or grooves formed by bars $f^2$, which bars are fastened or bolted to stands $a$ by bolts $f^3$, Fig. 1. Through the medium of set-screws $f^4$ and plates $f^5$, the cams may be so adjusted as to r- sist the forward or backward play through bar $f^2$. In order to allow for the automatic adjustment of the cams to the variable lengths of can-bodies so as to provide against mashing thereof, I secure the same and plate $f^5$ to bar $f^2$ by means of bolts $f^7$, which are surrounded by the spiral spring $f^6$, which bears against the bolt-nuts $f^3$. The resiliency of said spring is sufficient to always maintain the cams in position and to force inward the header-pistons $e^3$, and, after the heading of said cans, to withdraw the cam to its normal position, thereby allowing the outward movement of pistons $e^3$. The plates $h^4$ and $i^3$ are located on shaft $k$ and $l$ by means of bolts $h^5$ and $i^5$, and are secured to stands $a$ of the frame. To said stationary plates the guide-tracks $h$ $h'$ $h^2$, $i$ $i'$, and $i^2$ are secured, by means of bolts $h^6$ $i^6$, and are adapted to guide header and retaining rolls, as before described. The tracks $h^2$ and $h'$ I secure or fasten to vertical track $h^3$, by means of screws $h^7$, for the purpose of strengthening the ends thereof and to form a vertical pathway for the rolls $e^{13}$ of truck $e$, as hereinafter set forth. The track $i^2$ has formed on the front thereof the vertical portion corresponding with the vertical track $h^3$. The trucks $e$ and $g$, carrying header and retaining jaws, are operated through the medium of the rotating disks $m$ and $l^3$, which are fastened to and revolve with the shafts $k$ and $l$. Each of said disks, as clearly shown in Fig. 19, have openings or slots $m'$ and $l^4$ formed therein, within which the trucks $e$ and $g$ are secured and guided toward and from the center of shafts $k$ and $l$, as the tracks may require. In order to provide against the can-bodies and heads dropping from out of the feed-chute $c'$ $b'$ while the headers are moving into position to receive the same, I form the brackets $m^2$, which are secured to disks $m$ by bolts $m^3$. (Clearly shown in Fig. 19.) As one of the headers receives the heads and body and carries the same forward past chute $c'$ the brackets $m^2$ move thereunder and prevent the outfalling or dropping of the next body and heads. In order to allow for the automatic adjustment of the truck $g$ and registering thereof with header $e'$, I form the forward or front face of track $i$ slightly concave, as shown at $i^3$.

As the two rotating disks travel forward the header-jaws receive the heads and can-bodies, carrying the same forward past the chute, when the headers and retaining-jaws meet and completely inclose the body and heads, and as the disks continue their rotation the rolls $e^{13}$ and $g^{10}$ on headers and retaining-jaws are carried from within the circular trackway onto the vertical portion of tracks $h$ $h'$ and concaved portion of track $i$, and during the downward movement thereof the rolls $e^{20}$, secured to the ends of pistons $e^3$, contact with the inner face of spring-actuated cam $f$ and move the pistons inward, so as to force the heads upon the can-bodies. As the jaws are brought together the lips $e^9$ $g^7$, forming part of rings $e^8$ $g^6$, located within the headers and retaining-jaws, serve to contract the ends of the can-body sufficiently to permit the same to fit loosely within the flange of the can-heads while traveling the length of the vertical trackways, and while the can-heads and can-bodies are perfectly inclosed the heading operation of the can is completed, and by the continued movement of the disks the header and retaining jaws are carried from the vertical pathway into the circular one, and as they begin to move therein the holding-jaws gradually open and discharge the completed cans into chute $d$. By means of cams $e^{23}$ $g^{19}$ the empty jaws as carried around are forced open, so as to be in position to receive and encircle the can bodies and heads. As the heads are carried forward the upper portion of the jaws move somewhat above the axial line, which immediately upon the dropping of the heads and body from the chute $c'$ tends to force the same downward into the jaws, thus obviating liability of mashing the same. Should, however, the same bind, the swinging gate $b^3$ will serve to adjust and force the same within the jaws $e'$ until inclosed by the retaining-jaws $g'$, and held therebetween during the operation of heading. By thus throwing the header-jaws from their axial line during the rotation of the disks, I facilitate the dropping of the can bodies and heads.

The rings $e^8$ and $g^6$, with contracting lips $e^9$ and $g^7$, may be formed of any suitable metal, and are removably secured within the header and retaining jaws $e'$ $g'$, so that in case of damage or breakage resulting thereto the same may be readily removed and others inserted in lieu thereof. As the can-bodies are being headed the lips $e^9$ and $g^7$ contract the ends thereof sufficient to permit of the same fitting within the flange of the can-heads. Immediately upon the releasing of the cans, the bodies, being released of their end pressure, will expand so as to bind tightly against the can-head flange. By providing the heading-jaws $e'$ with the rings $e^8$, provided with lips $e^9$, I form a level seat for the can-bodies to rest upon, thereby bringing the same in true line with the can-heads, and thus allow for the perfect registering therewith and heading thereof, and at the same time dispense with the use of the ordinary carrier-wheels generally employed for this purpose.

I am aware that minor changes may be made in the arrangement of parts and details of construction herein shown and described, as, for instance, in place of oppositely-rotating disks having a continuous rotary motion a step or reciprocating motion may be given thereto; that instead of rotating disks endless traveling belts may be employed or one rotating disk carrying headers and an oppositely-traveling belt carrying retaining-jaws may be used without necessitating or creating a departure from the nature and scope of my invention. Consequently I do not wish to be understood as limiting or confining myself to two continuously-rotating disks carrying header and retaining jaws or mechanism for heading the bodies.

Throughout the specification, wherever the expressions "headers," "retaining-jaws," and "holding-jaws" are used, they are synonyms to indicate what heretofore has been known by the state of the art as "semicircular sockets."

Having thus described my invention, what I claim as new, and desire to secure protection in by Letters Patent of the United States, is—

1. In a can-heading machine, the combination of oppositely-operating mechanisms adapted to operate toward each other, heading and retaining jaws or clamps secured to the respective mechanisms and operating therewith, the former adapted to engage the side of the can and to hold the can-heads and the latter to register with the header jaws or clamps during the operation of the operating mechanisms and engage the side of the can so as to inclose said can side or body, and mechanism for forcing the heads onto the body, substantially as set forth.

2. In a can-heading machine, the combination of oppositely-rotating mechanisms rotating toward each other, header and retaining jaws secured thereto and rotating therewith, said jaws adapted to receive and separately hold can heads and bodies and during the rotation of the mechanisms to register, so as to inclose, to head, and to discharge the completed can during the continuous rotation, as and for the purpose set forth.

3. In a can-heading machine, the combination of oppositely-operating mechanisms adapted to operate toward each other, header and retaining jaws or clamps secured to the respective mechanisms and operating therewith, the former adapted to engage the side of the can and to hold the can-heads and the latter to register with the header jaws or clamps during the operation of the operating mechanisms and likewise engage the side of the can so as to inclose said can side or body, heading mechanism connected with the header-jaws, and actuated cams for automatically operating the heading mechanism during the operation of the operating mechanism, substantially as set forth.

4. In a can-heading machine, the combination of oppositely-operating mechanisms adapted to operate toward each other, header and retaining jaws or clamps secured to the respective mechanisms and operating therewith, the former adapted to engage the side of the can and to hold the can-heads and the latter to register with the header jaws or clamps during the operation of the operating mechanism and likewise engage the side of the can, so as to inclose said can side or body, and spring-actuated cams for automatically forcing the heads onto the body and allowing of adjustment to variable lengths of can-bodies during the operation of the operating mechanisms, substantially as set forth.

5. In a can-heading machine, the combination of the oppositely-rotating disks, said disks carrying at their periphery a series of header and retaining jaws adapted to receive and hold can heads and bodies, tracks for guiding the header and retaining jaws, and of the spring-actuated cams for operating the header-jaws during the rotation of the disks, substantially as and for the purpose set forth.

6. In a can-heading machine, the combination, with oppositely-rotating mechanisms, of the header and retaining jaws secured thereto and rotating therewith, said header and retaining jaws adapted to move from their axial line during rotation of the heading mechanisms for the purpose of perfect registering with each other and holding of heads and bodies during the operation of heading, substantially as and for the purpose set forth.

7. In a can-heading machine, the combination of oppositely-operating mechanisms adapted to operate toward each other, provided with header and retaining jaws operating therewith, the former provided with can-body seats for holding the body in true line with the can-heads for the purpose of perfectly registering therewith and also adapted to engage the side of the can and to hold the can-heads and the latter or retaining-clamps to register with the header jaws or clamps during the operation of the operating mechanisms and likewise engage the side of the can, so as to completely inclose said can side or body, and provided with registering can-body seats and mechanism for forcing the heads onto the bodies, substantially as set forth.

8. In a can-heading machine, the combination of oppositely-operating mechanisms adapted to operate toward each other, provided with header and retaining jaws or clamps, said jaws or clamps provided with can-body seats having lips secured thereto for contracting the ends of the can-body, the header jaws or clamps also adapted to engage the side of the can and to hold the can-heads, and the retaining jaws or clamps adapted to register with the header jaws or clamps during the operation of the operating mechanisms and likewise engage the side of the can, so as to inclose said can side or body, and mechanism for forcing the heads onto the bodies and contracting the ends of the can-bodies through the medium of the lips, substantially as set forth.

9. In a can-heading machine, the combination of oppositely-operating mechanisms adapted to operate toward each other, provided with header and retaining jaws or clamps, said jaws provided with can-body seats having lips secured thereto and with can-head seats therein, said header jaws or clamps also adapted to engage the side of the can and to hold the can-heads, and the retaining jaws or clamps adapted to register with the header jaws or clamps during the operation of the operating mechanism, and likewise engage the side of the can, so as to inclose said can side or body, substantially as set forth.

10. In a can-heading machine, the combination of the oppositely-rotating disks, radial guideways or grooves formed therein, header and retaining jaw trucks working within said guideways, and means for allowing the forward or backward adjustment of the trucks within the guideways or grooves, substantially as and for the purpose set forth.

11. In a can heading machine, the combination, with stationary disks provided with a series of tracks, of oppositely-operating heading mechanisms provided with header and retaining jaw trucks having outwardly-extending shafts or arms adapted to work within and upon said tracks for the purpose of guiding the header and retaining jaws, substantially as set forth.

12. In a can-heading machine, the combination, with the oppositely-rotating heading mechanism, of the header and retaining jaws provided with can-body and can-head seats, said seats adapted to hold the body and heads in true line with each other for the purpose of creating a perfect registering, substantially as and for the purpose set forth.

In testimony whereof I affix my signature in presence of two witnesses.

CHARLES B. KENDALL.

Witnesses:
N. A. ACKER,
M. G. LOEFLER.